(12) United States Patent
Fan

(10) Patent No.: US 7,161,559 B2
(45) Date of Patent: Jan. 9, 2007

(54) THREE DIMENSIONAL IMAGE PRESENTING DEVICE

(76) Inventor: Wen-Qin Fan, Building 3, No. 5, Jiang Bo Ting Yuan, Cheng Gong Li, Tou Fen Zhen, Miao Li Xian (TW)

( * ) Notice: Subject to any disclaimer, the term of this patent is extended or adjusted under 35 U.S.C. 154(b) by 490 days.

(21) Appl. No.: 10/798,439

(22) Filed: Mar. 12, 2004

(65) Prior Publication Data
US 2005/0012680 A1    Jan. 20, 2005

(30) Foreign Application Priority Data
Jun. 25, 2003    (TW) ............................... 92211541 U

(51) Int. Cl.
*G09G 5/00*    (2006.01)
(52) U.S. Cl. ............................................ 345/6; 348/51
(58) Field of Classification Search .................... 345/6; 348/51, 54
See application file for complete search history.

(56) References Cited

U.S. PATENT DOCUMENTS 5,793,918 A * 8/1998 Hogan ......................... 385/116
6,195,069 B1 * 2/2001 Rhoads ........................... 345/6

* cited by examiner

*Primary Examiner*—Richard Hjerpe
*Assistant Examiner*—Kevin M. Nguyen
(74) *Attorney, Agent, or Firm*—Bacon & Thomas, PLLC

(57) ABSTRACT

A three dimensional image presenting device includes a three dimensional image presenting plate, multiple three dimensional image presenting units defined in the three dimensional image presenting plate, wherein each three dimensional image presenting unit is a space defined in the three dimensional image presenting plate and has a convex end, and multiple optical fibers each having a distal end corresponding to one of the three dimensional image presenting units. An image displayed by the three dimensional image presenting plate is apparently three dimensional due to the convex end of the space.

17 Claims, 10 Drawing Sheets

THREE DIMENSIONAL IMAGE PRESENTING DEVICE

BACKGROUND OF THE INVENTION

1. Field of the Invention

The present invention relates to an image presenting device, and more particularly to a three dimensional image presenting device having an image presenting plate, multiple 3D image presenting units defined in the image presenting plate and multiple, optical fibers each corresponding to one of the 3D image presenting units such that when the image is presented and viewed by a viewer, due to diffusion effect of the 3D image presenting units, an apparent 3D image is observed.

2. Description of Related Art

A general commercial billboard is used to pass messages to the passers-by so that they are able to recall, even sub-consciously, the information. One of the most used commercial manners is the use of an image presenting device, such as a TV wall composed of multiple TV sets or a large screen composed of multiple LEDs (light emitting diode) which are controlled by a computer program. Thus, the image presented on the TV wall or the large screen is vivid. However, in either case, the image can only extend in both the X-axis and the Y-axis. That is, the image is two dimensional, as shown in FIG. 1. Although there are illusion movies presenting apparent three dimensional images in the market, the observer in the theater is required to wear a special goggle. Therefore, using the optical feature of the goggle and the difference between two eyes of the observer, apparent three dimensional movies are able to be seen. However, this system is clearly not practical for street advertising as the merchant can not ask each of the passersby to wear the goggle since it is too troublesome and costly.

To overcome the shortcomings, the present invention tends to provide an improved image presenting device to mitigate the aforementioned problems.

SUMMARY OF THE INVENTION

The primary objective of the present invention is to provide an improved 3D image presenting device having an image presenting plate with multiple 3D image presenting units and multiple optical fibers.

Another objective of the present invention is to use lenses to disperse the image to extend the image in the Z-axis such that the three dimensional effect is enhanced.

Other objects, advantages and novel features of the invention will become more apparent from the following detailed description when taken, in conjunction with the accompanying drawings.

DETAILED DESCRIPTION OF THE PREFERRED EMBODIMENT

Figure 1:
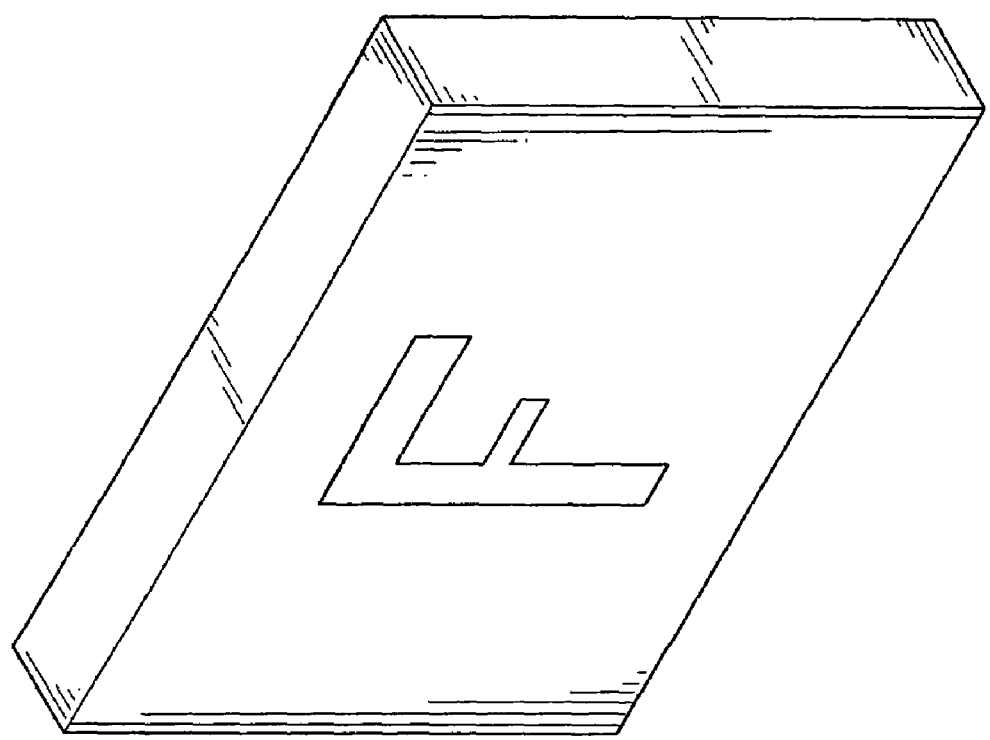
FIG. 1 is perspective view showing a conventional 2D image presented on a plane.
Figure 2:
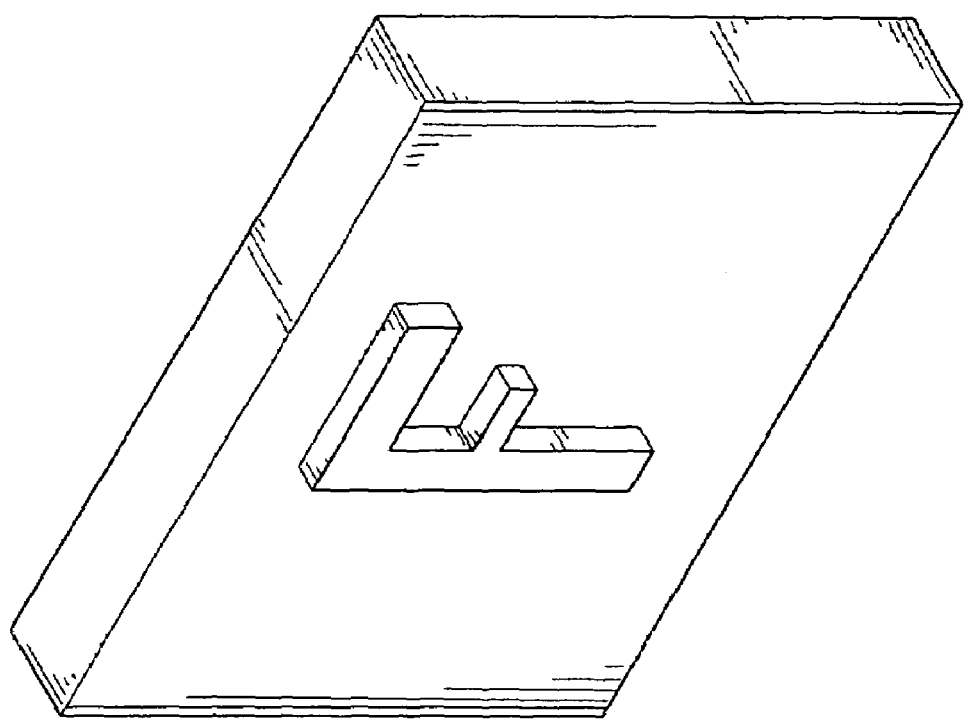
FIG. 2 is a perspective view showing a three dimensional image is presented using the structure of the present invention.
Figure 3A:
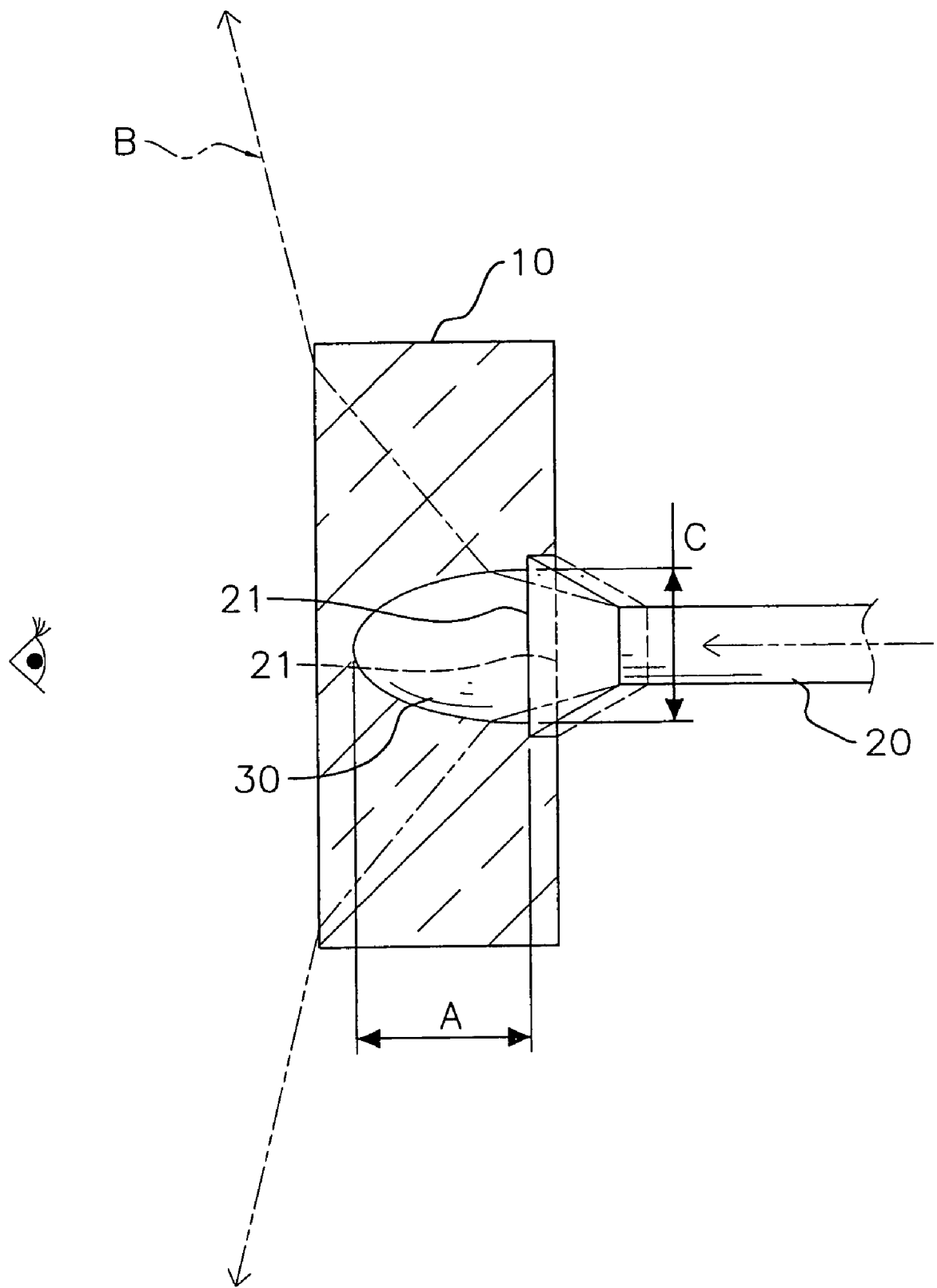
FIG. 3A is a schematic view showing the first embodiment of the geometric structure of the 3D image presenting device of the present invention.

With reference to FIGS. 2 and 3A, the 3D image presenting device in accordance with the present invention includes an image presenting plate (10), multiple optical fibers (20) (which may be replaced with any appropriate light transmitting element, such as light bulbs, tubes or screens) and multiple 3D image presenting units (30). Only one optical fiber (20) and one 3D image presenting unit (30) are shown in this embodiment.

The image presenting units (30) are defined in the image presenting plate (10). In this preferred embodiment, the image presenting units (30) are arcuate cutouts defined in the image presenting plate (10). Each of the optical fibers (20) has a distal end (21) which is placed at an entrance of a corresponding one of the image presenting units (30) or is inserted into the corresponding image presenting unit (30). It is noted that the optical fiber (20) is an example of a light source, the optical fiber (20) may be replaced with other sources such as a projector. Further, the image presenting unit (30) has a longitudinal length (C) and a latitudinal length (A) which is larger than the longitudinal length (C).

When the 3D image presenting device of the present invention is in application, an image is transmitted by the distal ends (21) of the optical fibers (20) and enters the image presenting units (30). Due to the arcuate shape of the image presenting units (30) in the image presenting plate (10), the image is dispersed and thus the image has a length in the Z-axis. When an observer is watching the image presenting plate (10) opposite to the optical fibers (20), because of the visual difference between the left eye and the right eye of the observer, the image presented is apparently three dimensional.

Figure 3B:
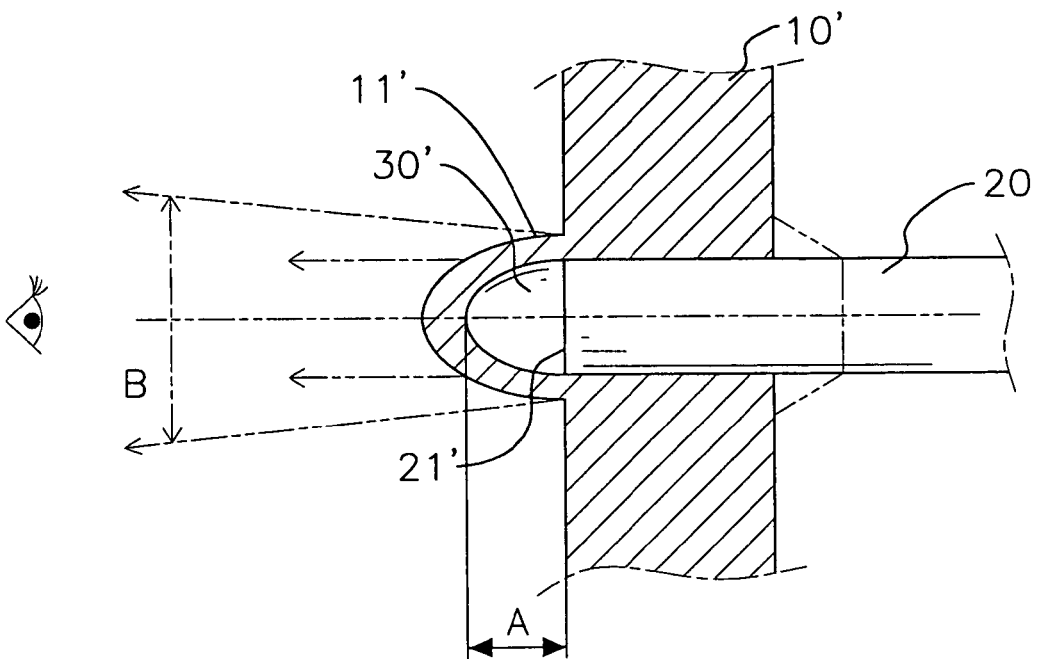
FIG. 3B is a schematic view showing a different geometric structure of the first embodiment of the present invention.

With reference to FIG. 3B, it is noted that the 3D image presenting plate (10') is provided with a 3D image presenting unit (30') which is a combination of a passage and an arcuate recess. The 3D image presenting plate (10') has an arcuate projection (11') extending out of a side wall of the 3D image presenting plate (10'). The arcuate recess is defined in the arcuate projection (11'). When the device of the present invention is application, the distal end (21') of the optical fiber (20) is extended to a joint between the arcuate recess and the passage. Thus due to the light refraction passing through the space in the arcuate recess and the arcuate projection (11') of the 3D image presenting plate (10'), the light from the distal end (21') of the optical fiber

(20) is dispersed. Therefore, the image presented and observed by a viewer is apparently three dimensional.

Figure 3C:
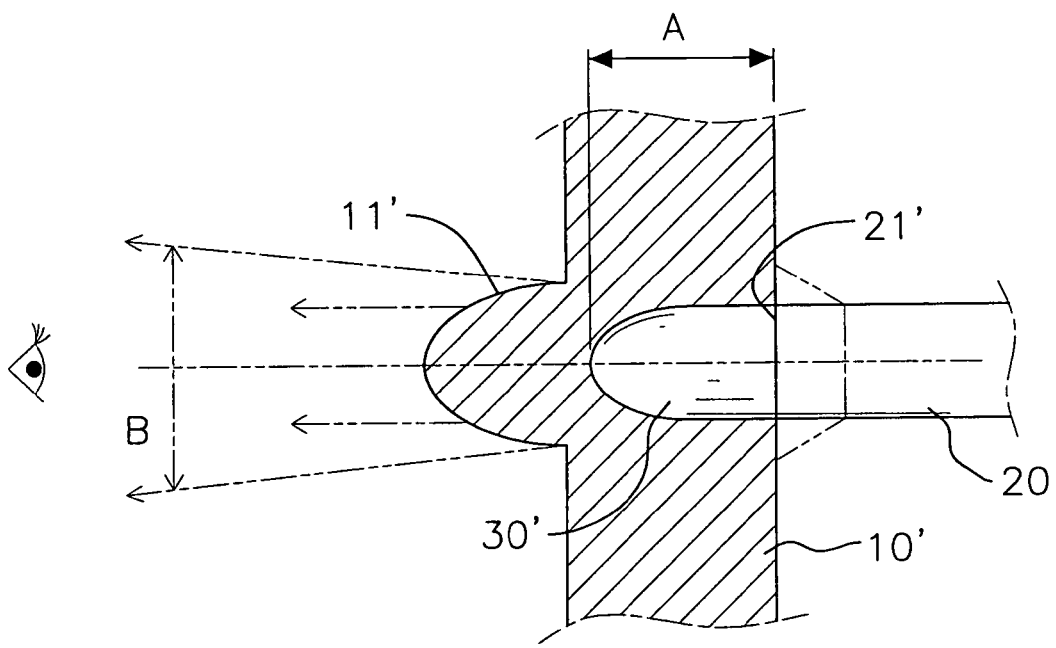
FIG. 3C is a schematic view showing another geometric structure of the first embodiment of the present invention.

With reference to FIG. 3C, it is to be noted that the arcuate recess is defined in the 3D image presenting plate (10') instead of the arcuate projection (11'). When the distal end (21') of the optical fiber (20) emits a light, the arcuate projection (11') is able to converge the light to avoid excessive dispersion of the light so as to form the three dimensional image. The 3D image presenting plate (10, 10') may be transparent or translucent. The arcuate projection (11') may be regarded as an optical lens having a focal length=∞. However, if other optical lenses are combined with the arcuate projection (11'), the focal lengths of the lenses are less than 0.

Figure 4:
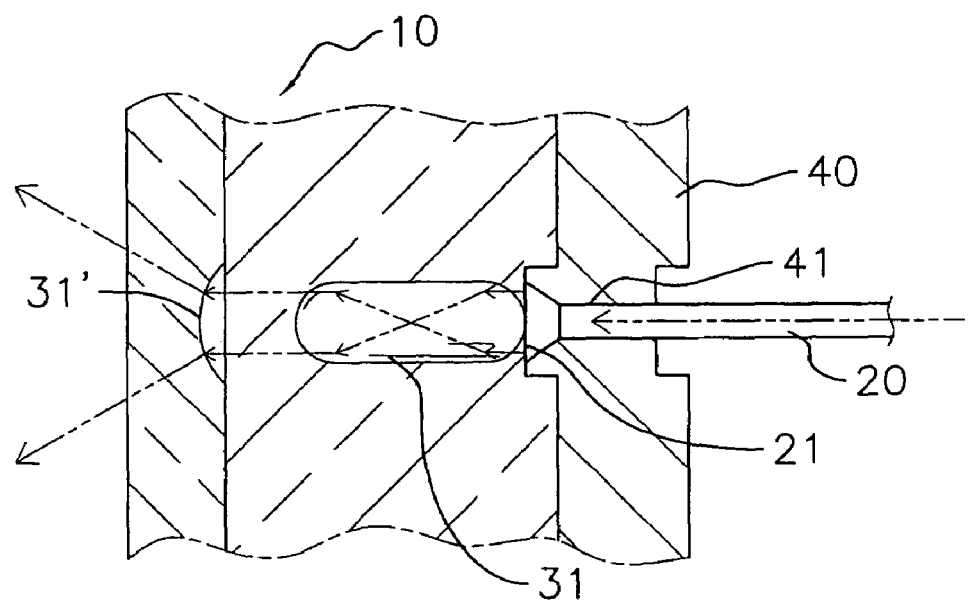
FIG. 4 is a schematic view showing the second embodiment of the present invention.

With reference to FIG. 4, a different embodiment of the present invention is shown and is a combination of two convex: lenses and a concave lens, wherein the 3D image presenting plate (10) is composed of two layers. A mounting seat (40) is attached to a side of the 3D image presenting plate (10) and has a passage (41) to receive therein an optical fiber (20). The distal end (21) of the optical fiber (20) is engaged with a side face of the 3D image presenting plate (10). The 3D image presenting unit (31) is defined as a space in one layer of the 3D image presenting plate (10) and having a projecting arcuate face in opposite ends of the space (31) to function as a convex lens. A concave lens (31') is provided in the other layer of the 3D image presenting plate (10) to align with the ends of the space (31). That is, the space (31) and the concave lens (31') are axially aligned.

Figure 5:
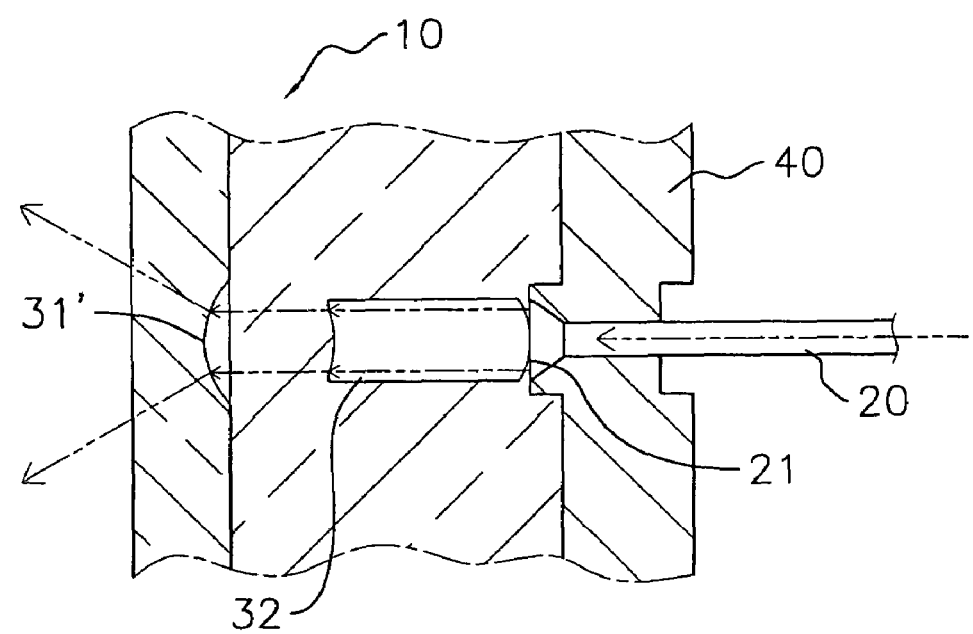
FIG. 5 is a schematic view showing the third embodiment of the present invention.

With reference to FIG. 5, the 3D image presenting plate (10) is the same as the embodiment shown in FIG. 4 and also has a mounting seat (40) for receiving therein the optical fiber (20). The 3D image presenting unit (32) has a convex end and a concave end, wherein the concave lens (31') is retained in the 3D image presenting plate (10). The distal end (21) of the optical fiber (20) corresponds to and engages with the convex end of the 3D image presenting unit (32) (the space).

Figure 6:
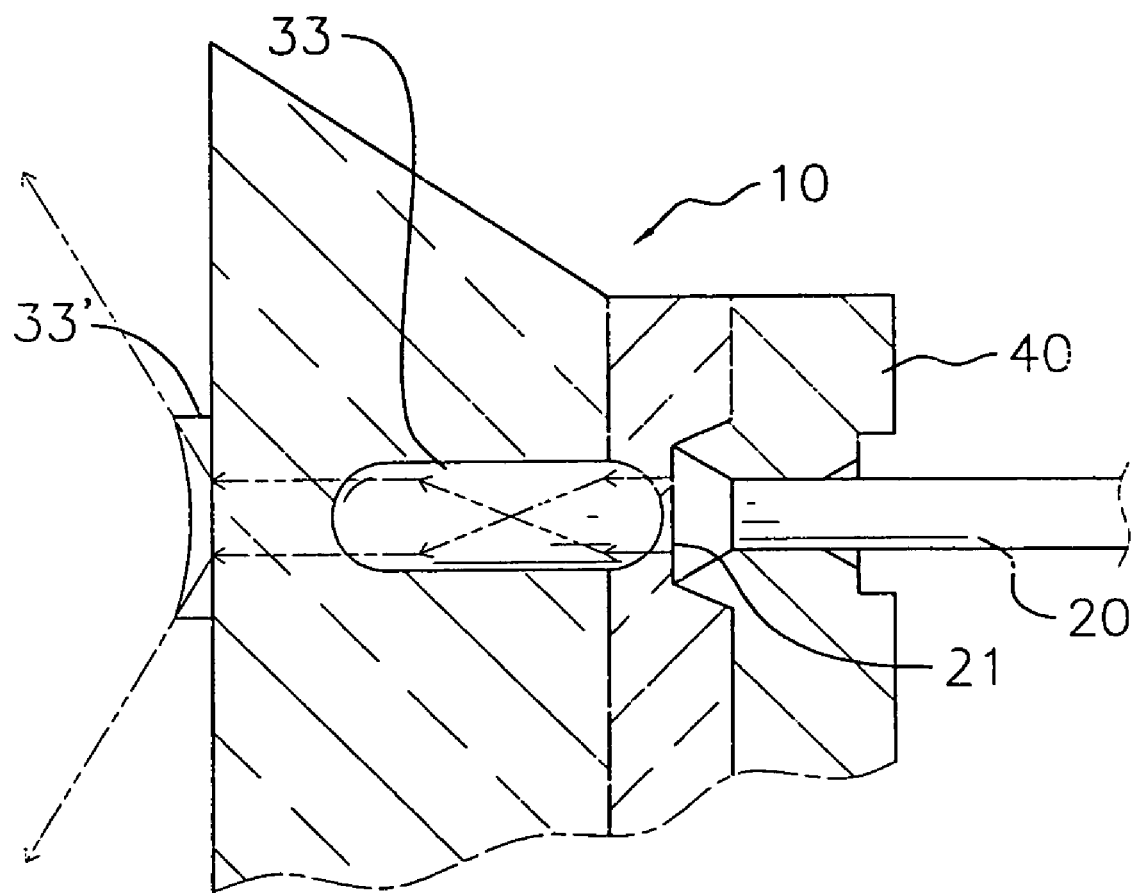
FIG. 6 is a schematic view showing the fourth embodiment of the present invention.

With reference to FIG. 6, it is noted that the space (33) (the 3D image presenting unit) is the same as that shown in FIG. 4. The distal end (21) of the optical fiber (20) is separated from engagement with the convex end of the space (33). A concave lens (33') is formed on the other layer of the 3D image presenting plate (10) to disperse the light from the distal end (21) of the optical fiber (20).

Figure 7:
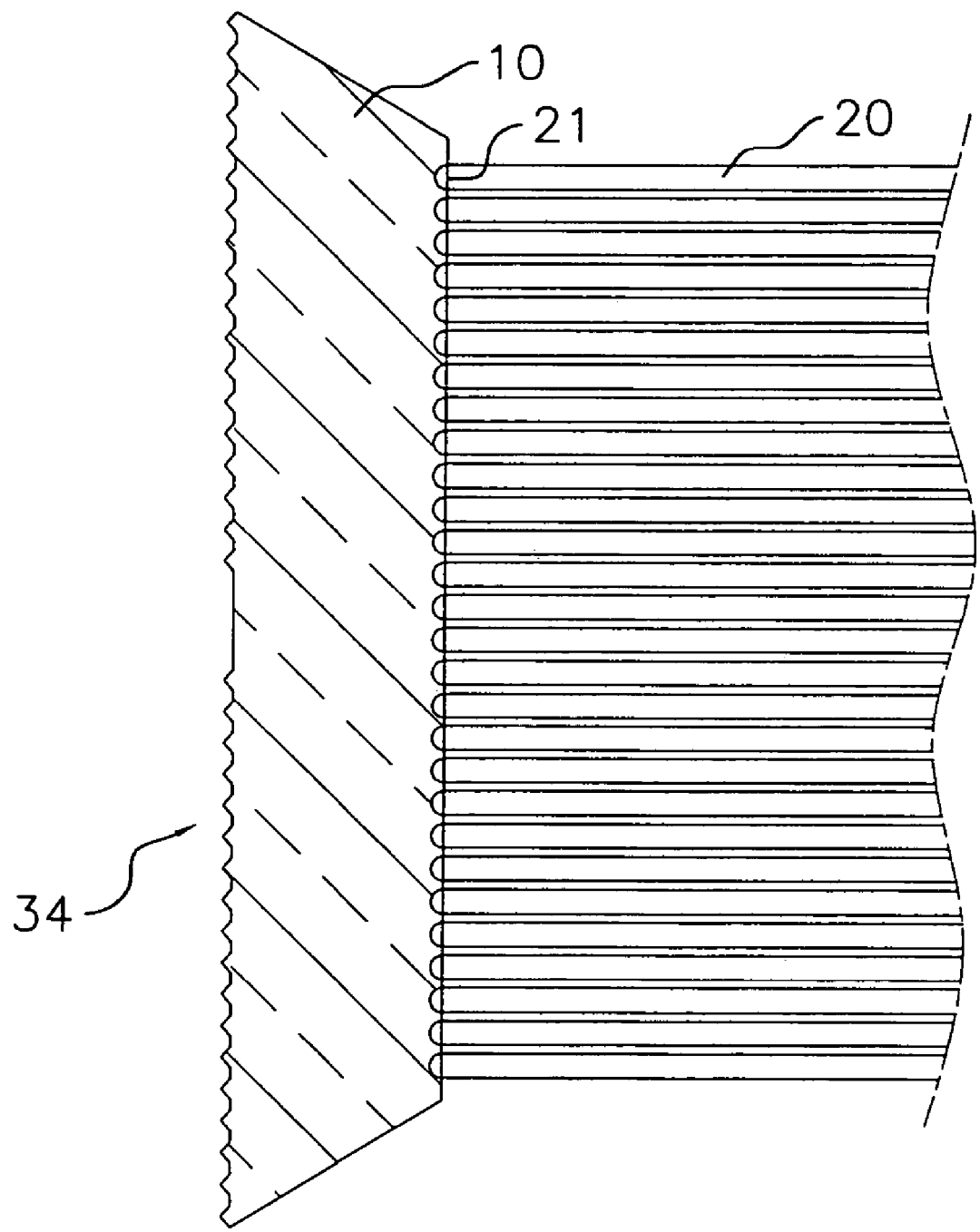
FIG. 7 is a schematic view showing the fifth embodiment of the present invention.
Figure 8:
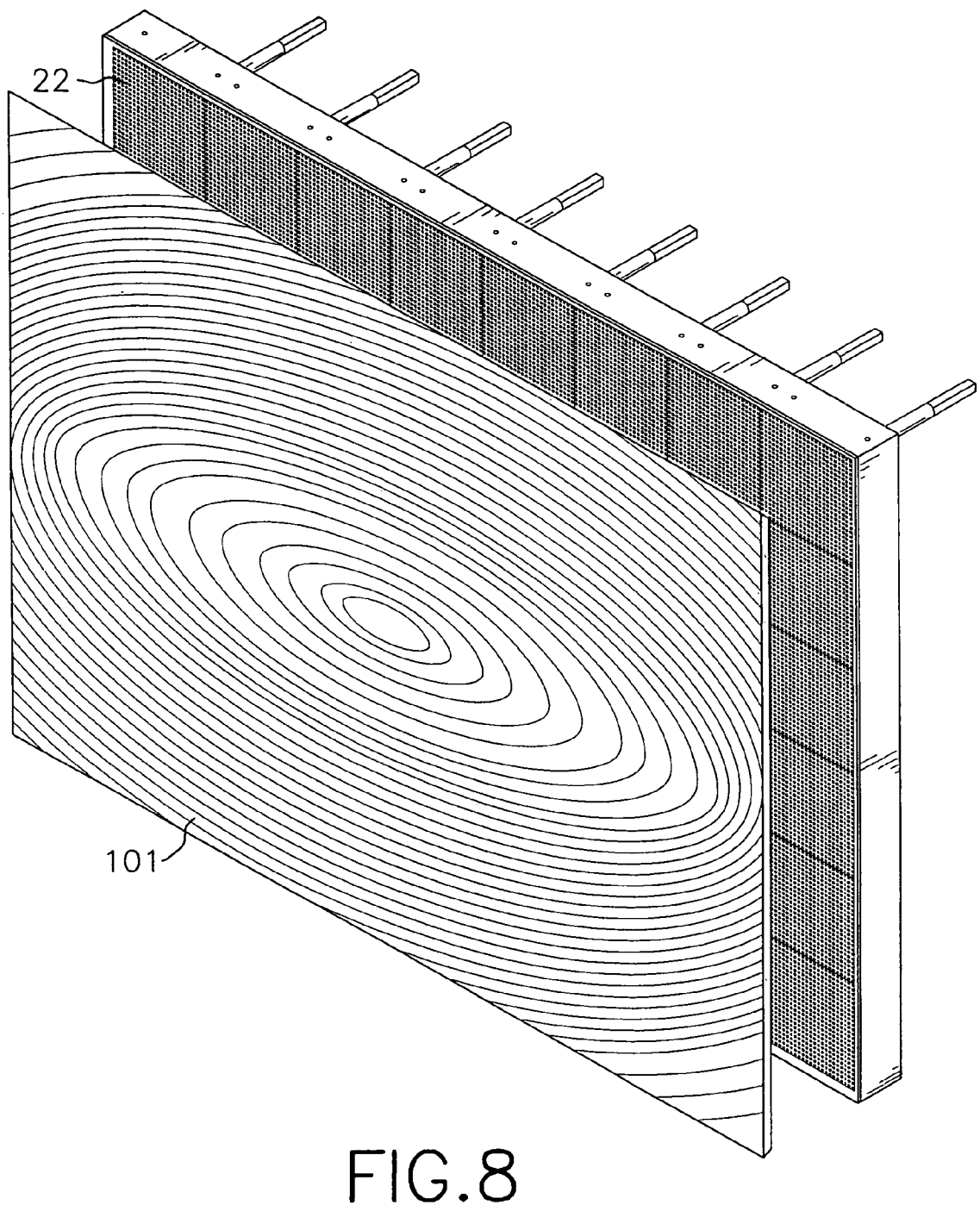
FIG. 8 is a schematic view showing the sixth embodiment of the present invention.

With reference to FIG. 7, the 3D image presenting plate (10) is changed to a column and has concave lenses formed on opposite side faces of the 3D image presenting plate (10) to form the 3D image presenting unit (34). Each of the optical fibers (20) corresponds to one of the lenses on one side of the 3D image presenting plate (10). With reference to FIG. 8, the 3D image presenting plate (101) is a large surface and multiple light directing units (22) are formed on one side of the 3D image presenting plate (101) to engage with optical fibers (not shown in this embodiment).

Figure 9:
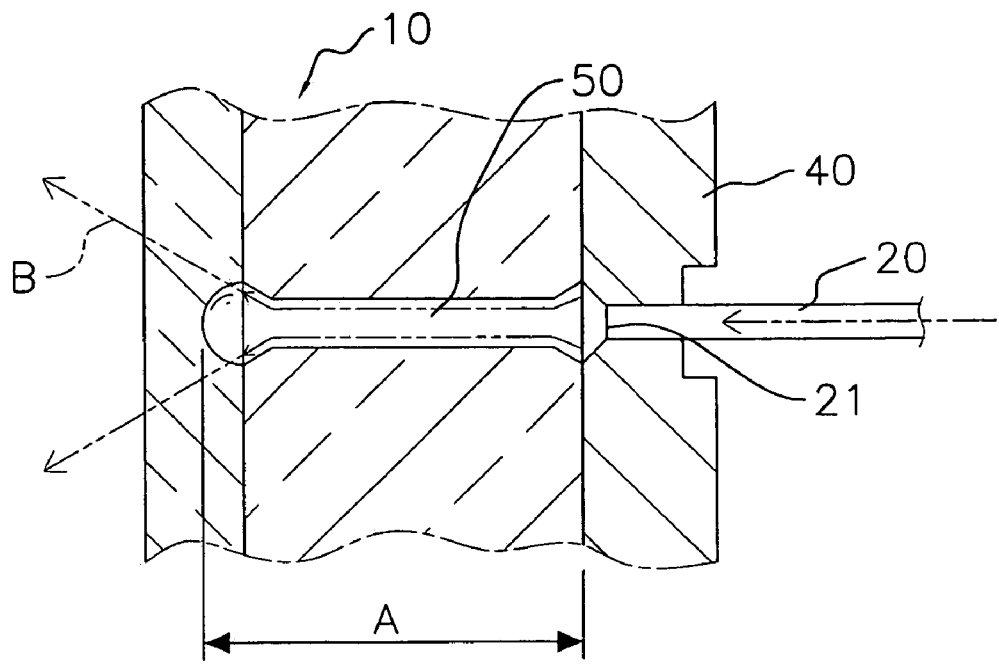
FIG. 9 is a schematic view showing the seventh embodiment of the present invention.
Figure 10:
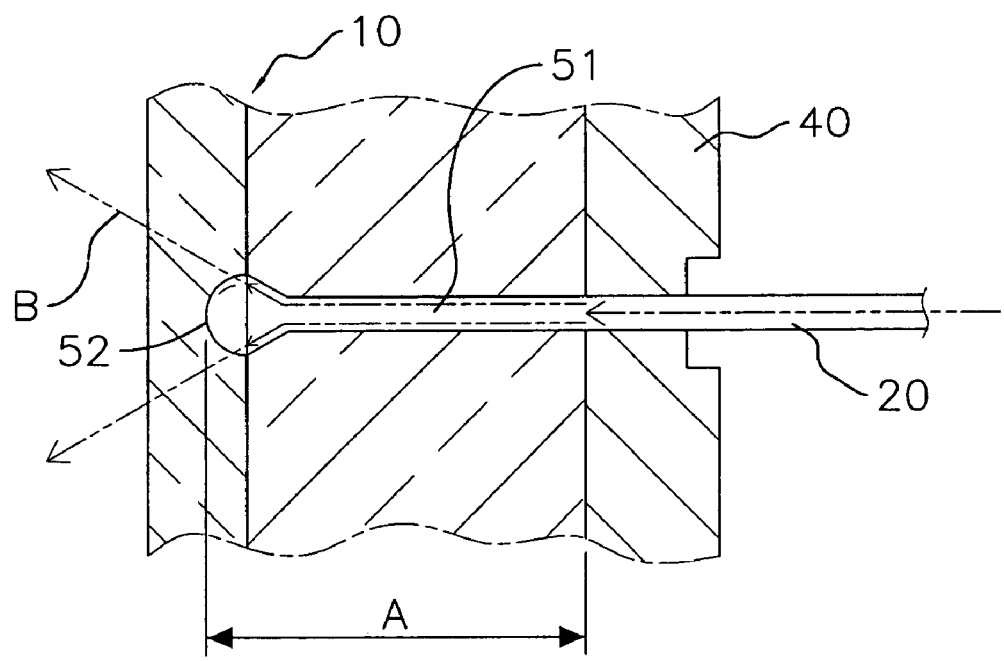
FIG. 10 is a schematic view showing the eighth embodiment of the present invention.

With reference to FIG. 9, the optical fiber (20) is received in the space (50) in the 3D image presenting plate (10). The space (50) has a flat end engaged with the distal end (21) of the optical fiber (20) and a convex lens at the other end of the space (50). With reference to FIG. 10, the optical fiber (20) is received in the space (51) in the 3D image presenting plate (10). The space (51) has a convex lens at a distal end of the space (51).

Figure 11:
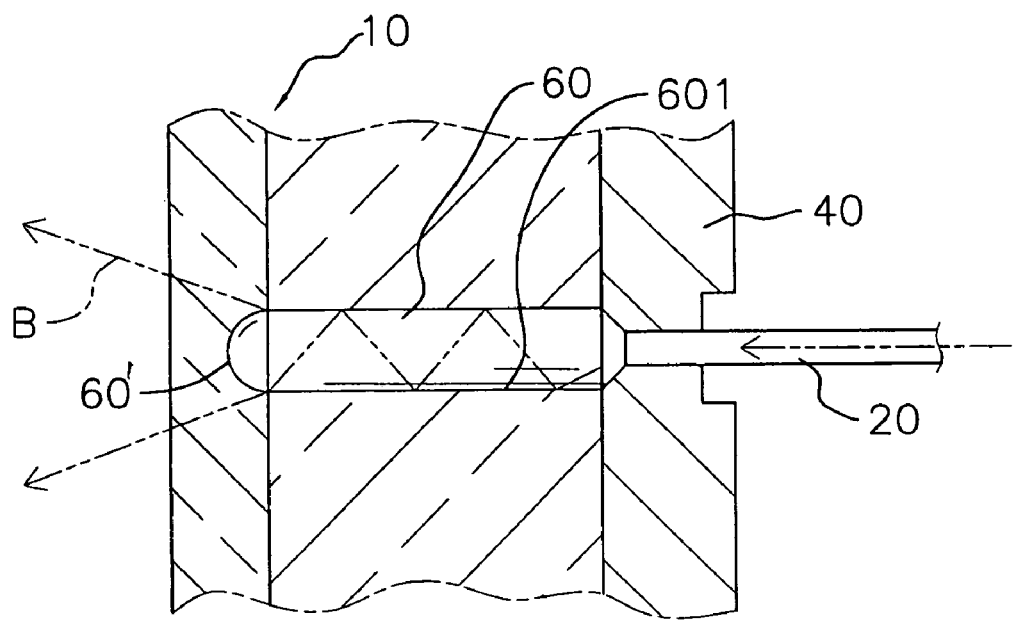
FIG. 11 is a schematic view showing the ninth embodiment of the present invention.

With reference to FIG. 11, it is noted that the space (60) defined in the two-layered 3D image presenting plate (10) is defined with a flat end engaging with the distal end (21) of the optical fiber (20) and an arcuate projection (60'). A coating (601) is provided to an inner face of the space (60). After the axial alignment between the optical fiber (20) and the space (60) is completed, the light from the optical fiber (20) passes through the space (60). Due to the optical effect of the arcuate projection (60'), the transmitted light is able to be presented in an apparent three dimensional manner.

Figure 12:
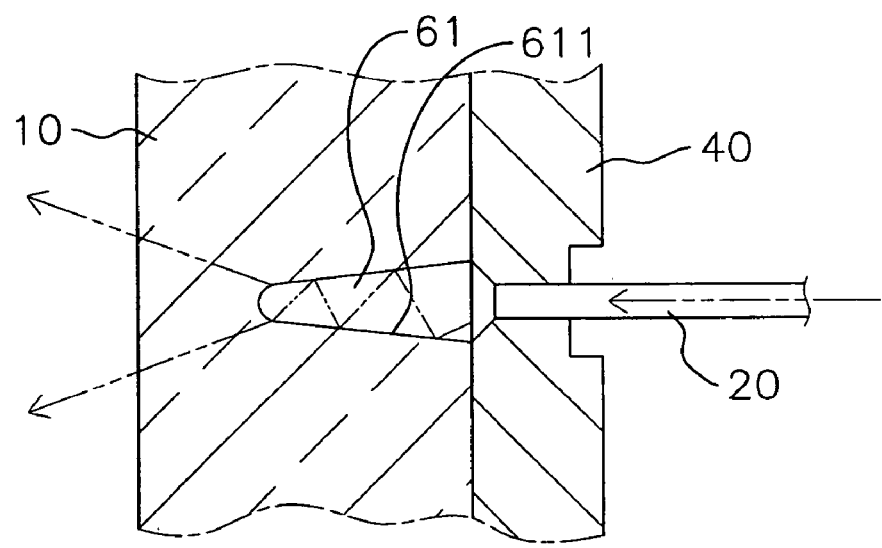
FIG. 12 is a schematic view showing the tenth embodiment of the present invention.

With reference to FIG. 12, it is noted that the 3D image presenting unit (61) is a conical space defined in the 3D image presenting plate (10) and has a coating (611) applied to an inner face of the conical space (61). The conical space (61) has a convex end to function as a convex lens.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A three dimensional image presenting device comprising:
   a three dimensional image presenting plate;
   multiple three dimensional image presenting units defined in the three dimensional image presenting plate, wherein each three dimensional image presenting unit is a space defined in the three dimensional image presenting plate and has a convex end; and
   multiple optical fibers each having a distal end corresponding to one of the three dimensional image presenting units, such that an image displayed by the three dimensional image presenting plate is apparently three dimensional due to the convex end of the space.

2. The device as claimed in claim 1, wherein the distal end of each optical fiber is located at a joint between the space and the optical fiber.

3. The device as claimed in claim 2, wherein each three dimensional image presenting unit has a longitudinal length and a latitudinal length which is larger than the longitudinal length.

4. The device as claimed in claim 1, wherein the three dimensional image presenting plate has an arcuate projection and the convex end of the space is defined in the arcuate projection, each one of the optical fibers is received in the corresponding three dimensional image presenting units and the distal end of the optical fiber is located at the joint between the space and the corresponding optical fiber.

5. The device as claimed in claim 2, wherein the three dimensional image presenting plate has an arcuate projection and the convex end of the space is defined in the arcuate projection, each one of the optical fibers is received in the corresponding three dimensional image presenting units.

6. The device as claimed in claim 3, wherein the three dimensional image presenting plate has an arcuate projection and the convex end of the space is defined in the arcuate projection, each one of the optical fibers is received in the corresponding three dimensional image presenting units.

7. The device as claimed in claim 2, wherein the three dimensional image presenting plate has an arcuate projection and the convex end of the space is defined in the three dimensional image presenting plate.

8. The device as claimed in claim 1, wherein the space has two convex ends and the distal end of the optical fiber engages with one of the two convex ends, the three dimensional image presenting plate is composed of two layers, one layer has a mounting seat to receive therein the optical fiber and the other layer has an optical lens formed therein, the optical lens corresponds to the two convex ends of the space and the distal end of the optical fiber.

9. The device as claimed in claim 2, wherein the space has two convex ends and the distal end of the optical fiber engages with one of the two convex ends, the three dimensional image presenting plate is composed of two layers, one layer has a mounting seat to receive therein the optical fiber and the other layer has an optical lens formed therein, the optical lens corresponds to the two convex ends of the space and the distal end of the optical fiber.

10. The device as claimed in claim 9, wherein the optical lens is a convex lens.

11. The device as claimed in claim 9, wherein the optical lens is a concave lens.

12. The device as claimed in claim 1, wherein the space has a convex end and a concave end, the distal end of the optical fiber engages with the convex end, the three dimensional image presenting plate is composed of two layers, one layer has a mounting seat to receive therein the optical fiber and the other layer has an optical lens formed therein, the optical lens corresponds to the two convex ends of the space and the distal end of the optical fiber.

13. The device as claimed in claim 2, wherein the space has a convex end and a concave end, the distal end of the optical fiber engages with the convex end, the three dimensional image presenting plate is composed of two layers, one layer has a mounting seat to receive therein the optical fiber and the other layer has an optical lens formed therein, the optical lens corresponds to the two convex ends of the space and the distal end of the optical fiber.

14. The device as claimed in claim 1, wherein the three dimensional image presenting plate is composed of two layers, one layer is provided with a mounting seat to receive therein the optical fiber and the arcuate end of the space is defined in the other layer of the three dimensional image presenting plate.

15. The device as claimed in claim 14, a coating is applied in an inner face of the space.

16. The device as claimed in claim 2, wherein the space is conical.

17. The device as claimed in claim 15, wherein the space is conical.

* * * * *